United States Patent [19]

Caro et al.

[11] Patent Number: 4,842,360
[45] Date of Patent: Jun. 27, 1989

[54] HIGH ENERGY LASER-TO-WAVEGUIDE COUPLING DEVICES AND METHODS

[75] Inventors: Richard G. Caro, Boston; Troy M. Harmon, Watertown, both of Mass.

[73] Assignee: Summit Technology, Inc., Watertown, Mass.

[21] Appl. No.: 64,827

[22] Filed: Jun. 18, 1987

[51] Int. Cl.$^4$ .............................................. G02B 6/32
[52] U.S. Cl. ................................ 350/96.18; 350/96.20
[58] Field of Search ............... 350/96.15, 96.17, 96.18, 350/96.19, 96.20, 96.21, 96.22, 319; 250/227, 552; 357/17, 19, 30, 74

[56] References Cited

U.S. PATENT DOCUMENTS

| | | | |
|---|---|---|---|
| 3,705,992 | 12/1972 | Ippen et al. | 350/96.18 X |
| 4,137,060 | 1/1979 | Timmermann | 65/31 |
| 4,193,663 | 3/1980 | Timmermann | 350/96.18 |
| 4,199,222 | 4/1980 | Ikushima et al. | 350/96.19 |
| 4,281,891 | 8/1981 | Shinohara et al. | 350/96.18 |
| 4,402,569 | 9/1983 | Bow et al. | 350/96.26 |
| 4,521,070 | 6/1985 | Sottini et al. | 350/96.15 |
| 4,641,912 | 2/1987 | Goldenberg | 350/96.10 |
| 4,732,448 | 3/1988 | Goldenberg | 350/96.18 |
| 4,762,385 | 8/1988 | Fuse | 350/96.18 |

FOREIGN PATENT DOCUMENTS

| | | |
|---|---|---|
| 194841 | 9/1986 | European Pat. Off. . |
| 194842 | 9/1986 | European Pat. Off. . |
| 3112167 | 10/1982 | Fed. Rep. of Germany ... 350/96.15 |
| 3514374 | 1/1986 | Fed. Rep. of Germany . |
| 3600713 | 1/1986 | Fed. Rep. of Germany . |
| 61-122614 | 6/1986 | Japan .............................. 350/96.15 |
| 86/03598 | 6/1986 | World Int. Prop. O. . |

Primary Examiner—John D. Lee
Attorney, Agent, or Firm—Thomas J. Engellenner

[57] ABSTRACT

Laser-to-waveguide coupling devices and methods are disclosed employing an aperture, and an imaging lens. The aperture clips the beam edges to flatten the spatial intensity profile, and the lens mirror-images the plane of the aperture onto the waveguide face with appropriate magnification or demagnification to match the input beam dimensions to those of the waveguide. In one preferred embodiment, a first focusing lens is also employed in conjunction with a pinhole aperture and a second imaging lens. The first focusing lens focuses the laser beam onto the aperture and thereby reduces the optical path length. The second imaging lens images the plane of the aperture onto the waveguide.

33 Claims, 2 Drawing Sheets

HIGH ENERGY LASER-TO-WAVEGUIDE COUPLING DEVICES AND METHODS

BACKGROUND OF THE INVENTION

The technical field of the invention is optics and, in particular, devices and methods for transmitting laser radiation to optical fibers and similar light waveguides. The coupling devices and methods disclosed herein are useful in a wide variety of laser applications, including laser surgery and laser materials processing, where efficient coupling of high peak power laser radiation to a waveguide without damage is desired.

The use of lasers for surgical and industrial purposes is increasingly commonplace. In many applications, high peak power laser radiation, such as that provided by pulsed excimer lasers and the like, is employed. For example, commonly owned U.S. patent application Ser. No. 731,961 by Clarke and Muller, herein incorporated by discloses the use of excimer laser radiation to photoablate atherosclerotic lesions with minimal thermal effects or surrounding tissue damage. However, the use of high peak power lasers in conjunction with waveguides (such as optical fibers) can pose problems. Although it is typically desirable to deliver the maximum possible energy to a waveguide in a pulse of short duration, the energy is often limited by the optical damage threshold at the input face of the waveguide.

Even when the face of the waveguide is smooth as a result of polishing or cleaving of the fiber or otherwise treated to minimize reflection and scattering, optical damage will occur for input energy fluences considerably lower than the damage threshold of the bulk material of the waveguide. This imposes a limitation on the amount of energy from a high peak power laser that can be delivered through an optical waveguide. This limitation is made more severe because the intensity profile of the laser beam typically is such that the energy is concentrated at the center of beam and falls off sharply at the peripheral edges. The energy that can be coupled into an optical waveguide is thus often a function of the peak energy density incident onto the input face, rather than the average energy density. The damage threshold is further dependent on other characteristics of the laser, such as wavelength, laser energy, pulse length and beam divergence.

Since many applications of high peak power lasers require delivery through optical waveguides at high energy fluences, there exists a need for better coupling devices and methods for transmitting laser radiation without damage to waveguides. More efficient coupling devices and methods which can increase the "fill factor" of laser-to-waveguide energy coupling would satisfy a substantial need in the field of commercial optics.

SUMMARY OF THE INVENTION

The present invention concerns coupling devices and methods for improving the "fill factor" of laser energy entering an optical fiber or other waveguide without damaging the waveguide. Optical systems and techniques are disclosed for maximizing the energy throughput of a waveguide for a laser beam where peak intensity is a determining factor in waveguide damage. The invention is particularly useful for coupling high peak power lasers, such as ultraviolet excimer lasers, pulsed Nd:YAG lasers and $CO_2$ TEA lasers. The invention has additional applications to coupling high-average-power lasers into waveguides and to coupling both high and low power lasers to small optical waveguides.

Laser-to-waveguide coupling devices and methods are disclosed employing an aperture, and an imaging lens. The aperture clips the beam edges to flatten the spatial intensity profile, and the lens images the plane of the aperture onto the waveguide face with appropriate magnification or demagnification to match the input beam dimensions to those of the waveguide. In one preferred embodiment, a first focusing lens is also employed in conjunction with a pinhole aperture and a second imaging lens. The first focusing lens focuses the laser beam onto the aperture and thereby reduces the optical path length. The second imaging lens images the plane of the aperture onto the waveguide.

The coupling systems of the present invention can be used to couple any type of laser beam into a fiber or other waveguide. They are particularly well suited to the coupling of high-peak-power beams into fibers because they maximize the "fill factor" of the beam incident on the fiber surface, thus maximizing the transmitted energy for a given energy damage threshold. They have the further advantage that the beam forming aperture is imaged onto the fiber face. When the aperture is a hard aperture, the energy incident on the fiber cladding is substantially reduced to zero, so long as the magnification of the imaging lens is such that the size of the image of the aperture on the face of the fiber is less than the core size of the fiber.

The invention will next be described in connection with certain preferred embodiments; however, it should be clear that various additions, subtractions and modifications can be made by those skilled in the art without departing from the spirit or scope of the invention. For example, the size of the aperture will depend upon the initial size of the laser output beam and the focal power of the focusing lens. The material from which the aperture-defining element is constructed will vary depending upon the nature of the laser (e.g., continuous or pulsed). The angle of incidence of the imaged beam onto the input surface of the waveguide should be kept below a critical angle determined by the numerical aperture of the waveguide. Although simple, converging lenses are illustrated, it should be clear that various other optical lens shapes and/or reflective structures can be employed to achieve the same results. Finally, the present invention can be used in conjunction with other coupling devices and techniques, such as antireflective coatings or intermediate step-index media, to further maximize transmissive efficiencies.

BRIEF DESCRIPTION OF THE DRAWINGS

FIG. 1A is a graph of beam intensity versus cross-section location for a typical input beam in the plane of the aperture in the system of FIG. 1.

FIG. 1B is a graph of beam intensity versus cross-sectional location for a typical output beam in the plane of the waveguide input face in the system of FIG. 1.

DETAILED DESCRIPTION

A typical laser beam, when focused, has a spatial intensity profile and a temporal profile that can be described by functions f(x,y) and g(t). The spatial intensity profile f(x,y) may be of many shapes but typically has one or more regions of high intensity, and other areas of lower intensity, decreasing in places substantially to zero energy fluence. The temporal intensity profile, g(t), likewise has intensity maxima at particular times.

The time- and space-dependent profile of the beam on the fiber face can be described by the intensity profile $I(x,y,t) = I_o f(x,y) g(t)$ in which f(x,y) has a maximum at $(x_o, y_o)$ and g(t) a maximum at $t = t_o$. Theory and experiment show that fiber damage often occurs at the point $(x_o, y_o, t_o)$, when the maximum intensity $I_{max} = I_o f(x_o, y_o) g(t_o)$ is reached. As used herein, Intensity=Energy/(beam area×pulse duration).

If the beam intensity is set such that $I_{max} = I_{dam}$, where $I_{dam}$ is the surface damage threshold of the fiber core (a material constant at a given wavelength), then the maximum energy that can be coupled into the fiber is $$E = \iiint_{-\infty}^{\infty} I_o f(x, y) g(t) dx dy dt \quad (1)$$

The magnitude of E is dependent on the detailed spatial distribution f(x,y) and will be maximized when f(x,y) has the form of a "top hat" distribution.

If $E_{max}$ is defined by $$E_{max} = \int_{-\infty}^{\infty} I_o f(x_o, y_o) g(t) dt \quad (2)$$

then the ratio of $E/E_{max}$ can be called the "fill factor." This factor typically is in the range of 0.1–0.2 for normal beams and traditional coupling geometries.

Figure 1:
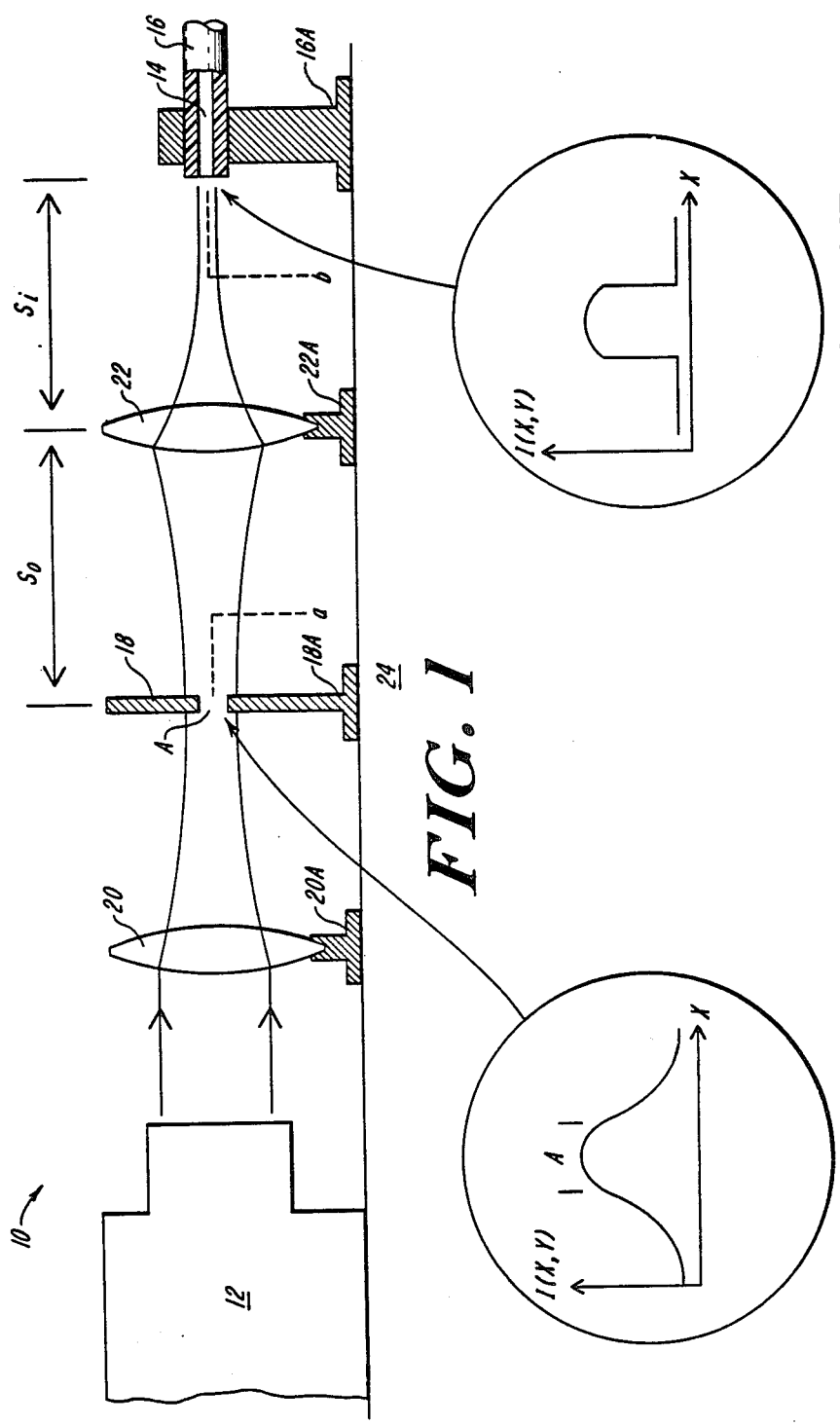
FIG. 1 is a schematic illustration of a coupling system according to the present invention.

FIG. 1 discloses a coupling system 10 for coupling a laser 12 to the transmissive core 14 of an optical waveguide such as a fiber 16. The system 10 includes a first, focusing lens 20, an aperture-defining element 18 and a second, imaging lens 22. The laser 12 is typically fixed to or disposed within, a housing 24. The fiber 16 as well as the elements of the coupling system 18, 20 and 22 are similarly fixed to housing 24 by mounting blocks 16A, 18A, 20A and 22A, respectively. The system 10 serves to convert the initial spatial profile (FIG. 1A) into a more nearly top-hat profile (FIG. 1B).

The focusing lens 20 in FIG. 1 serves to reduce the beam dimensions down to an appropriate size for passage through the aperture and permits the system to be operated with a shorter optical path length. Although similar savings in optical path length can be obtained with a complex or telescopic system, the use of focusing lens 20 achieves the path length reduction and avoids degradation of the beam imaged at the input face of the waveguide. For typical beam divergence and simple lenses, it can be difficult to achieve large-scale demagnification at the waveguide face without introducing diffraction effects or lens aberrations unless a focusing lens is employed.

The aperture-defining element 18 can be of any durable material and will depend on the nature of the laser beam. For a pulsed excimer laser, tungsten carbide, or diamond pinholes are particularly suitable to define the aperture. The size of the focused beam should be large enough that the aperture is not destroyed by the high intensity focused beam. The size of the aperture must be matched to the size of the beam, so that a reasonable fraction of energy is transmitted through the aperture and so that the ratio of transmitted energy fluence to peak energy fluence is adequately high to improve coupling through the fiber. Typically, the diameter of the aperture will range from about 0.05 mm to about 50 mm and from about 0.30 mm to 2 mm when a focusing lens is employed. For high average power laser beams, cooling of the aperture may be desirable, and a highly thermally conductive aperture material, such as copper or another thermally conductive metal, would be preferable.

In one embodiment, an excimer beam was employed of dimension 16 mm×7 mm incident on a lens 20 with focal length of 500 mm. The focused beam had dimensions of 1.6 mm×3.0 mm. An aperture-defining element 18 of tungsten carbide containing an aperture, A, of 1.0 mm diameter was placed in the focal plane where the intensity was 210 MW/cm$^2$ (1.3 J/cm$^2$). This did not destroy the tungsten carbide pinhole. The fill factor of the beam incident on the aperture was 0.2, while the fill factor of the transmitted beam was 0.63.

Lens 22 is used to mirror-image the plane of the aperture onto the face of fiber 16 with an appropriate magnification, so as to match the image dimensions to those of the fiber core 14. In this way, the fiber is optimally filled with a beam which has a spatial profile closely approximating a "top-hat" and an energy fill factor nearing unity. The focal length, $f_2$ at lens 22 is chosen to be large enough so that the ratio of focal length to beam diameter at the lens is sufficiently large to minimize the effect of lens aberration. Preferably the ratio should range from about 8 to 12 for simple lenses. It should also be small enough so that the optical path length of the entire system ($S_o + S_i$ does not become excessively long. If the core of the fiber has a diameter of b mm, the lens must image the aperture onto the fiber face with a magnification M where M=b/a and a is the aperture diameter. In addition, the angle of the beam incident on the fiber must be less than that determined by the numerical aperture (N.A.) of the fiber.

Thus, for example, for an aperture of diameter a=1 mm and a fiber of diameter b=400 μm, the magnification must be M=0.4. For a typical numerical aperture of N.A.=0.2, the beam incident on the fiber surface must subtend less than θ=12 degrees (half angle) in order to minimize energy loss in the fiber at the fiber core/cladding interface (N.A.=$n_o$sin $\theta c$; $n_o$=refractive index of input medium; $\theta_c$=critical angle). More generally, the second imaging lens should have a focal length chosen such that the imaged beam incident on the end face of the waveguide subtends on angle less than the critical angle defined by the numerical aperture of the waveguide. The relationship between imaging distances and focal length of lens 22 is given by the expression $$\frac{1}{f_2} = \frac{1}{S_o} + \frac{1}{S_i} \quad (3)$$

where $S_o$, $S_i$ are the distances between lens 22 and the object (aperture) and image (fiber) planes, respectively.

The magnification of lens 22 is given by $$M = S_i/S_o \tag{4}$$

In one embodiment, a lens of focal length f=75 mm was used for element 22. For an aperture of diameter a=1.0 mm and a fiber of core diameter b=400 μm, the required magnification of M=0.4 was obtained for $S_o$=263 mm, $S_i$=96 mm. The angle subtended by the beam incident on the fiber surface was θ=2 degrees (half angle).

When the aperture is a hard aperture, the energy incident on the fiber cladding is substantially reduced to zero, so long as the magnification of the imaging lens 22 is such that the size of the image of the aperture on the face of the fiber is less than the core size of the fiber. This is very important for the coupling of many types of laser beams into fibers, even continuous wave lasers. The absorption of the fiber cladding and outer layers of jacketing and buffer is often considerably greater than that of the core. Thus, absorption of laser light in the cladding can often be a mechanism for fiber damage in the absence of the imaging system described here.

This coupling system can be used to couple any type of laser beam into a fiber or other waveguide. It is particularly well suited to the coupling of high peak power beams into fibers because it maximizes the fill factor of the beam on the fiber surface, thus maximizing the transmitted energy for a given energy damage threshold. Using simple fused silica lenses, this system has been demonstrated with an excimer laser beam. The excimer laser radiation was coupled into a variety of fibers having core diameters ranging from 200 μm to 1 mm. The fill factor of a 308 nm beam on the fibers was increased from approximately 0.2 to 0.7. As a result, the maximum energy obtainable from the fiber increased by a factor of 3–10. For fibers of core sizes 200 μm, 400 μm and 600 μm, output fluences of 11 J/cm$^2$ (2GW/cm$^2$) were obtained from one meter lengths of fused silica core fibers. To achieve this, average input fluences of 16 J/cm$^2$ (3GW/cm$^2$) were used with a fill factor of 0.6 at the fiber input.

The laser used in this work was equipped with a stable resonator consisting of two plane parallel reflectors. The output beam was highly multimode and had a high divergence (approximately 1 mrad×3 mrad). This resulted in a relatively large focal spot and allowed the use of a large aperture. An unstable resonator can also be used, but the aperture size for a given lens would then, preferably, be much smaller.

It should also be noted that a key element in this design is the maximization of the fill factor in the plane of the fiber input face. Even excimer lasers which emit beams with very highly uniform and top-hat profiles do not necessarily allow this in the absence of the imaging system used here, since the focal plane distribution of such an emitted beam will approximate a Bessel function and not a top-hat distribution.

Figure 2:
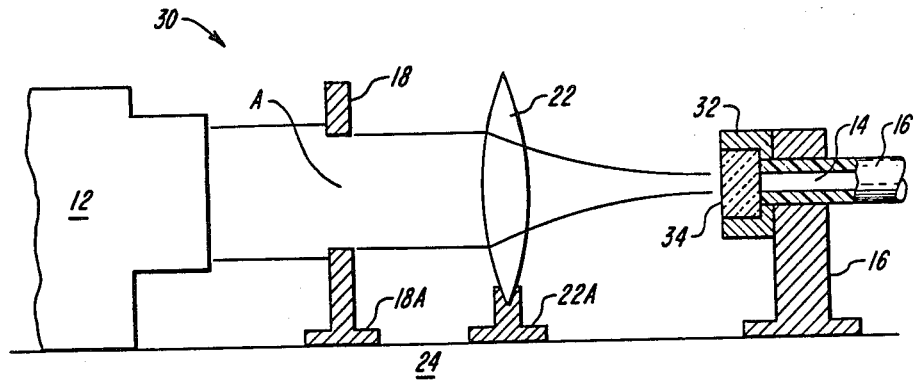
FIG. 2 is a schematic illustration of another embodiment of a coupling system according to the invention in which an intermediate step-index medium is employed.

Although the coupling system described above in connection with FIG. 1 includes a focusing lens 20 to focus the laser beam onto a pinhole aperture, it should be clear that the coupling system can also be operated without a focusing lens. Such a system 30 is shown in FIG. 2, including just an aperture defining element 18 and imaging lens 22 similarly mounted and adapted to couple the radiation beam from laser 12 to the transmissive core 14 of fiber waveguide 16. The size of the aperture in such a system would, of course, be larger (e.g., as large as 50 mm) to accommodate the larger, unfocused beam. The arrangement can be advantageous, for example, in coupling radiation from a continuous wave laser source to a fiber because the larger aperture would promote better heat dissipation. The coupling system 30 of FIG. 2 can also be used advantageously whenever the laser beam emitted by laser 12 is a low divergence (essentially diffraction limited) beam.

Also shown in FIG. 2 is an adaptor 32 having an intermediate optically transmissive medium 34 of different properties than the fiber core 14. As shown in FIG. 2, the adaptor can include a solid block of material having an intermediate index of refraction. Such solid materials are known and typically useful for long wavelength (i.e., infrared) radiation. Alternatively, the solid block material 34 can be replaced by a thin coating on the fiber face in particular applications to likewise increase the damage threshold. The use of such transmissive adaptors and/or film coatings are known in the art and do not detract from the utility of the present invention but rather can be used to augment it.

Figure 3:
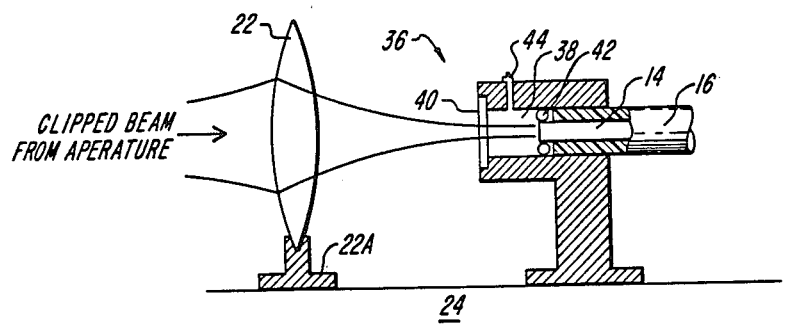
FIG. 3 is a schematic illustration of another embodiment of a coupling system according to the invention in which an evacuated or fluid-filled chamber is disposed between the imaging lens and the waveguide.

Higher damage thresholds can also be obtained by employing the coupling systems of the present invention in conjunction with a gas, liquid or vacuum chamber disposed between the imaging lens and the fiber. An apparatus for such purposes is shown in FIG. 3, in which an adaptor 36 is disposed between the lens 22 and the fiber 16. The adaptor 36 includes chamber 38 with a transparent (preferably anti-reflection coated) end wall 40 and O-ring seal 42 and a port 44. The chamber 38 can be evacuated via port 44 to provide a vacuum/fiber interface or can be filled with a suitable gas or liquid to further enhance coupling efficiency. In each of these applications, the coupling systems of the present invention can be employed in conjunction with such adaptors.

Figure 4:
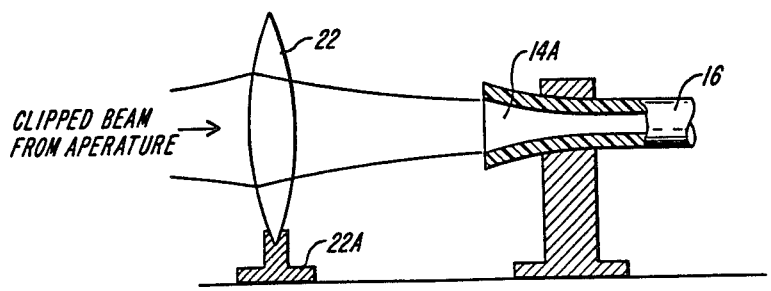
FIG. 4 is a schematic illustration of another embodiment of a coupling system according to the invention in which a tapered waveguide is employed.

The invention can also be practiced with tapered input waveguides as shown in FIG. 4 where the end of the waveguide 16 includes an expanded fiber core 14A which is progressively reduced in cross-sectional area. In this embodiment, the imaging lens should continue to image the aperture plane onto the end face of the expanded core and not onto a plane within the core.

We claim:

1. A coupling apparatus for coupling a high energy laser radiation beam from a laser to an optical waveguide, the coupling apparatus comprising:

an aperture-defining element disposed between a high energy laser and an optical waveguide, the aperture-defining element having an aperture which permits a central portion of the radiation beam to pass therethrough while a peripheral portion of the beam is clipped, such that the spatial intensity profile of the beam is flattened; and an imaging lens for imaging the plane of the aperture onto an end face of the optical waveguide.

2. The apparatus of claim 1 wherein the apparatus further includes a focusing lens disposed between the laser and the aperture-defining element for focusing the radiation beam from the laser onto the aperture.

3. The apparatus of claim 2 wherein the focusing and imaging lenses are converging, fused-silica lenses.

4. The apparatus of claim 2 wherein the focusing lens has a focal length of about 200 mm to about 10 meters.

5. The apparatus of claim 1 wherein the aperture-defining element has an aperture ranging from about 0.05 millimeters to about 50 millimeters in diameter.

6. The apparatus of claim 1 wherein the aperture-defining element has an aperture ranging from about 0.3 millimeters to about 2 millimeters in diameter.

7. The apparatus of claim 1 wherein the aperture-defining element is a tungsten carbide element.

8. The apparatus of claim 1 wherein the aperture-defining element is a diamond cut-out.

9. The apparatus of claim 1 wherein the aperture-defining element is a heat-dissipating metal.

10. The apparatus of a claim 1 wherein the imaging lens further provides appropriate magnification to match the clipped beam dimensions with the dimensions of the waveguide.

11. The apparatus of claim 1 wherein the imaging lens has a focal length chosen such that the imaged beam incident on the end face of the waveguide subtends an angle less than a critical angle defined by the numerical aperture of the waveguide.

12. The apparatus of claim 1 wherein the apparatus further includes an index-matching medium disposed between the imaging lens and the end face of the waveguide.

13. The apparatus of claim 1 wherein the imaging lens has a focal length of about 50 mm to about 500 mm.

14. The apparatus of claim 1 wherein the apparatus further includes an evacuated chamber disposed between the second imaging lens and the end face of the waveguide.

15. The apparatus of claim 1 wherein the apparatus further includes a fluid-filled chamber disposed between the second imaging lens and the end face of the waveguide.

16. The apparatus of claim 1 wherein the apparatus further includes a variable diameter waveguide.

17. A method of coupling a high energy laser radiation beam from a laser to an optical waveguide, the method comprising:
disposing an aperture-defining element along an optical axis between a high energy laser and a waveguide, such that an aperture on said element permits a central portion of the beam to pass therethrough while a peripheral portion of the beam is clipped, whereby the spatial intensity profile of the beam is flattened; and
disposing an imaging lens between the aperture and an end face of the optical waveguide to image the aperture onto the end face and thereby permit a clipped beam of reduced spatial intensity variation from the laser to fill the optical waveguide.

18. The method of claim 17 wherein the method further includes disposing a focusing lens between the laser and the aperture defining element to focus the beam from the laser onto the aperture.

19. The method of claim 18 wherein the step of disposing a focusing lens further includes disposing a converging, fused-silica lens.

20. The method of claim 18 wherein the step of disposing a focusing lens further includes disposing a lens having a focal length of about 200 mm to about 10 meters.

21. The method of claim 17 wherein the step of disposing an aperture-defining element between the laser and the optical fiber further includes disposing an element having an aperture ranging from about 0.05 millimeters to about 50 millimeters in diameter.

22. The method of claim 17 wherein the step of disposing an aperture-defining element between the laser and the optical fiber further includes disposing an element having an aperture ranging from about 0.3 millimeters to about 2 millimeters in diameter.

23. The method of claim 17 wherein the step of disposing an aperture-defining element further includes disposing an element formed from tungsten carbide.

24. The method of claim 17 wherein the step of disposing an aperture-defining element further includes disposing an element formed by a diamond cut out.

25. The method of claim 17 wherein the step of disposing an aperture-defining element further includes disposing an element formed from a heat-dissipating metal.

26. The method of claim 17 wherein the step of disposing an imaging lens further includes disposing a lens having appropriate magnification to match the clipped beam dimensions with the dimensions of the fiber.

27. The method of claim 17 wherein the step of disposing an imaging lens further includes disposing a converging, fused-silica lens.

28. The method of claim 17 wherein the step of disposing an imaging lens further includes disposing a lens having a focal length chosen such that the image being incident on the end face of the fiber subtends an angle less than the critical angle defined by the numerical aperture of the waveguide.

29. The method of claim 17 wherein the step of disposing an imaging lens further includes disposing a lens having a focal length ranging from about 50 mm to about 500 mm.

30. The method of claim 17 where the method further comprises disposing an index-matching medium between the second imaging lens and the end face of the waveguide.

31. The method of claim 17 wherein the method further includes disposing an evacuated chamber between the second imaging lens and the end face of the waveguide.

32. The method of claim 17 wherein the method further includes disposing a fluid-filled chamber between the second imaging lens and the end face of the waveguide.

33. The method of claim 17 wherein the method further includes employing a variable diameter waveguide at the input end of the optical waveguide.

* * * * *